UNITED STATES PATENT OFFICE.

MORGAN W. BROWN, OF BROOKLYN, NEW YORK, ASSIGNOR TO WASHINGTON QUINLAN, OF SAME PLACE.

PREPARING PAPER FOR COPYING PURPOSES.

SPECIFICATION forming part of Letters Patent No. 283,322, dated August 14, 1883.

Application filed July 21, 1883. (No specimens.)

*To all whom it may concern:*

Be it known that I, MORGAN W. BROWN, a citizen of the United States, and a resident of the city of Brooklyn, county of Kings, and State of New York, have invented a new and useful Improvement in Method or Process of Preparing Paper for Copying Purposes, and in the product thereof, of which the following is a specification.

The nature of my invention consists in a new method or process for treating paper so as to render it permanently moist for copying purposes, and in the article so produced.

I take one pound of the salt known as the "chloride of magnesium" and dissolve it in a moderate quantity of cold or warm water, and it is ready for use. I use from one-half a pound to a pound of water to the pound of chloride of magnesium and find that the most desirable amount, but can use more or less according to circumstances. The chloride of magnesium may be dissolved in other liquids; but I use water as being equally good. Apply this solution to the sheets of ordinary copying-paper, whether in book form or otherwise, in any usual and well-known manner, and preferably by applying said compound to cloth pads well saturated with the liquids, and then place the pads between any suitable number of leaves; then apply a pressure at first very moderate until the absorption of the paper is complete; then remove the cloth pads and apply under the press a strong pressure, and the books or sheets of paper so treated are ready for copying purposes, the use of the solution of chloride of magnesium being the radical or base of this invention.

In all cases use copying inks or fluids which are preferable.

Paper prepared by this method will remain permanently moist at any ordinary temperature, and if made dry by any extraordinary heat will regain its moisture upon being subjected to the common temperature.

I am aware that compounds composed mainly of glycerine have heretofore been used for moistening paper for copying purposes; but the method or process herein set forth has many advantages over and is a great improvement upon all methods heretofore used for treating paper so as to make it perpetually moist for copying purposes. It is much more economical than methods heretofore used, as there is a great saving in cost of materials, time, and labor, it only costing about one-eighth as much to treat paper by this method as by methods previously used. Sheets of paper prepared by this method will not adhere to each other, as is frequently the case where the paper is prepared by previously-known methods where compounds composed mainly of glycerine are used; and hence paper prepared by the method or process herein described is more suitable and convenient for copying purposes and will take a very clear and distinct copy.

What I claim as my invention, and desire to secure by Letters Patent, is—

1. The method or process for treating paper for copying purposes, so as to render it permanently moist, by moistening or saturating such paper with a solution of the chloride of magnesium, substantially as set forth and specified.

2. As a new manufacture, paper impregnated with chloride of magnesium, for the purpose set forth.

In testimony that I claim the foregoing as my invention I have signed my name, in presence of two witnesses, this 20th day of July, 1883.

MORGAN W. BROWN.

Witnesses:
WILLIS D. INSLEE,
W. H. TOWNLEY.